United States Patent
Kim

(10) Patent No.: US 9,495,096 B2
(45) Date of Patent: Nov. 15, 2016

(54) MOBILE TERMINAL AND CONTROLLING METHOD THEREOF

(71) Applicant: LG ELECTRONICS INC., Seoul (KR)

(72) Inventor: Taeyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 13/777,822

(22) Filed: Feb. 26, 2013

(65) Prior Publication Data

US 2014/0164974 A1    Jun. 12, 2014

(30) Foreign Application Priority Data

Dec. 10, 2012 (KR) .................. 10-2012-0142585

(51) Int. Cl.
G06F 3/0481    (2013.01)
G06F 3/0488    (2013.01)

(52) U.S. Cl.
CPC .................. *G06F 3/04883* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,063,600 A | * | 11/1991 | Norwood | 382/186 |
| 5,220,649 A | * | 6/1993 | Forcier | 715/273 |
| 5,347,295 A | * | 9/1994 | Agulnick | G06F 1/1626 345/156 |
| 5,347,624 A | * | 9/1994 | Takanashi | G09G 5/14 345/641 |
| 5,389,745 A | * | 2/1995 | Sakamoto | G06F 3/04883 178/18.03 |
| 5,392,363 A | * | 2/1995 | Fujisaki et al. | 382/187 |
| 5,502,803 A | * | 3/1996 | Yoshida | G06F 17/24 345/179 |
| 5,581,633 A | * | 12/1996 | Hotta et al. | 382/171 |
| 5,796,866 A | * | 8/1998 | Sakurai et al. | 382/187 |
| 5,835,631 A | * | 11/1998 | Mori | A61B 5/16 382/181 |
| 6,493,464 B1 | * | 12/2002 | Hawkins et al. | 382/189 |
| 8,219,908 B2 | * | 7/2012 | Napper et al. | 715/268 |
| 2003/0028851 A1 | * | 2/2003 | Leung | G06F 3/04883 715/268 |
| 2004/0091176 A1 | * | 5/2004 | Bai | G06F 17/2217 382/305 |
| 2005/0088418 A1 | * | 4/2005 | Nguyen | 345/173 |
| 2006/0050962 A1 | * | 3/2006 | Geiger | G06K 9/222 382/186 |
| 2007/0274590 A1 | * | 11/2007 | Arai | 382/187 |
| 2009/0295737 A1 | * | 12/2009 | Goldsmith et al. | 345/169 |
| 2012/0050328 A1 | * | 3/2012 | Karoji | G06K 9/00402 345/636 |

* cited by examiner

*Primary Examiner* — Phenuel Salomon
(74) *Attorney, Agent, or Firm* — Lee, Hong, Degerman, Kang & Waimey; Jonathan Kang; Harry Lee

(57) ABSTRACT

A mobile terminal and controlling method thereof are disclosed, by which a handwriting input is enabled and by which a handwritten character saved as an image can be further utilized. According to the present invention, when a user directly inputs a character by handwriting, a text corresponding to each handwritten character is saved by being linked to the handwritten character. The user is facilitated to correctly search handwritten characters saved as image for a specific word or the like using the saved confirmed text. By mapping the handwritten character saved as the image correctly using the saved confirmed text, the handwritten character is modifiable or utilizable in various ways. Therefore, a handwritten character saved as an image in a mobile terminal can be further utilized.

20 Claims, 19 Drawing Sheets

FIG. 6

Text data base (D1)

| Confirmed text | Coordinates in page | Location of page | User ID | ... |
|---|---|---|---|---|
| h | (3, 6) | Note 1, P2 | A | ... |
| e | (4, 6) | Note 1, P2 | A | ... |
| l | (5, 6) | Note 1, P2 | A | ... |
| l | (6, 6) | Note 1, P2 | A | ... |
| o | (7, 6) | Note 1, P2 | A | ... |
| ... | ... | ... | ... | ... |

MOBILE TERMINAL AND CONTROLLING METHOD THEREOF

Pursuant to 35 U.S.C. §119(a), this application claims the benefit of earlier filing date and right of priority to Korean Application No. 10-2012-0142585, filed on Dec. 10, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for enabling a handwriting input and further utilizing a handwritten character saved as an image.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

There are ongoing efforts to support and increase the functionality of mobile terminals. Such efforts include software and hardware improvements, as well as changes and improvements in the structural components which form the mobile terminal.

Recently, a mobile terminal is equipped with a handwriting input system for enabling a user to directly perform a handwriting input. If a user directly writes a letter on a touchpad or the like, such a handwriting input system exactly saves the inputted letter as an image. Alternatively, the handwriting input system recognizes the inputted letter, converts the recognized letter to a text, and then saves the corresponding text.

However, when letters inputted by handwriting are saved as an image, it is difficult to search the saved letters for a specific word. Since a mobile terminal recognizes the letters not as a text but as an image, this search has accuracy lower than that of a case of searching a text for a word and needs a search time longer than that of the case of searching the text for the word.

Besides, when letters inputted by handwriting are saved by being converted to a text, it may be easy to search the saved letters for a specific word. However, it is disadvantageous in that the emotional sensibility unique to a cursive style disappears.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which a handwritten character inputted by a user in direct is saved as an image in the mobile terminal and by which an efficient function of a search for the handwritten character saved as the image can be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a touchscreen configured to receive an input of a handwritten character and a controller configured to control the touchscreen to display one or more candidate texts for the handwritten character on inputting of the handwritten character by recognizing the handwritten character in real-time, save the handwritten character as an image, and save one of the candidate texts as a confirmed text corresponding to the handwritten character linking the confirmed text to the handwritten character saved as an image.

In another aspect of the present invention, a method of controlling a mobile terminal according to the present invention may include the steps of receiving an input of a handwritten character on a touchscreen, displaying one or more candidate texts for the handwritten character on inputting of the handwritten character by recognizing the handwritten character in real-time, saving the handwritten character as an image and saving one of the candidate texts as a confirmed text corresponding to the handwritten character linking the confirmed text to the handwritten character saved as an image.

In a further aspect of the present invention, a recording medium according to the present invention may include $1^{st}$ to $4^{th}$ commands recorded therein, wherein the $1^{st}$ command is provided for receiving an input of a handwritten character on a touchscreen, wherein the $2^{nd}$ command is provided for displaying one or more candidate texts for the handwritten character on inputting of the handwritten character by recognizing the handwritten character in real-time, wherein the $3^{rd}$ command is provided for saving the handwritten character as an image, and wherein the $4^{th}$ command is provided for save one of the candidate texts as a confirmed text corresponding to the handwritten character linking the confirmed text to the handwritten character saved as an image.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 is a diagram for one example of a text database for storing a confirmed text extracted by the embodiment shown in FIG. 5;

When a character inputted as a text is converted to a handwritten character by the method shown in FIG. 15.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
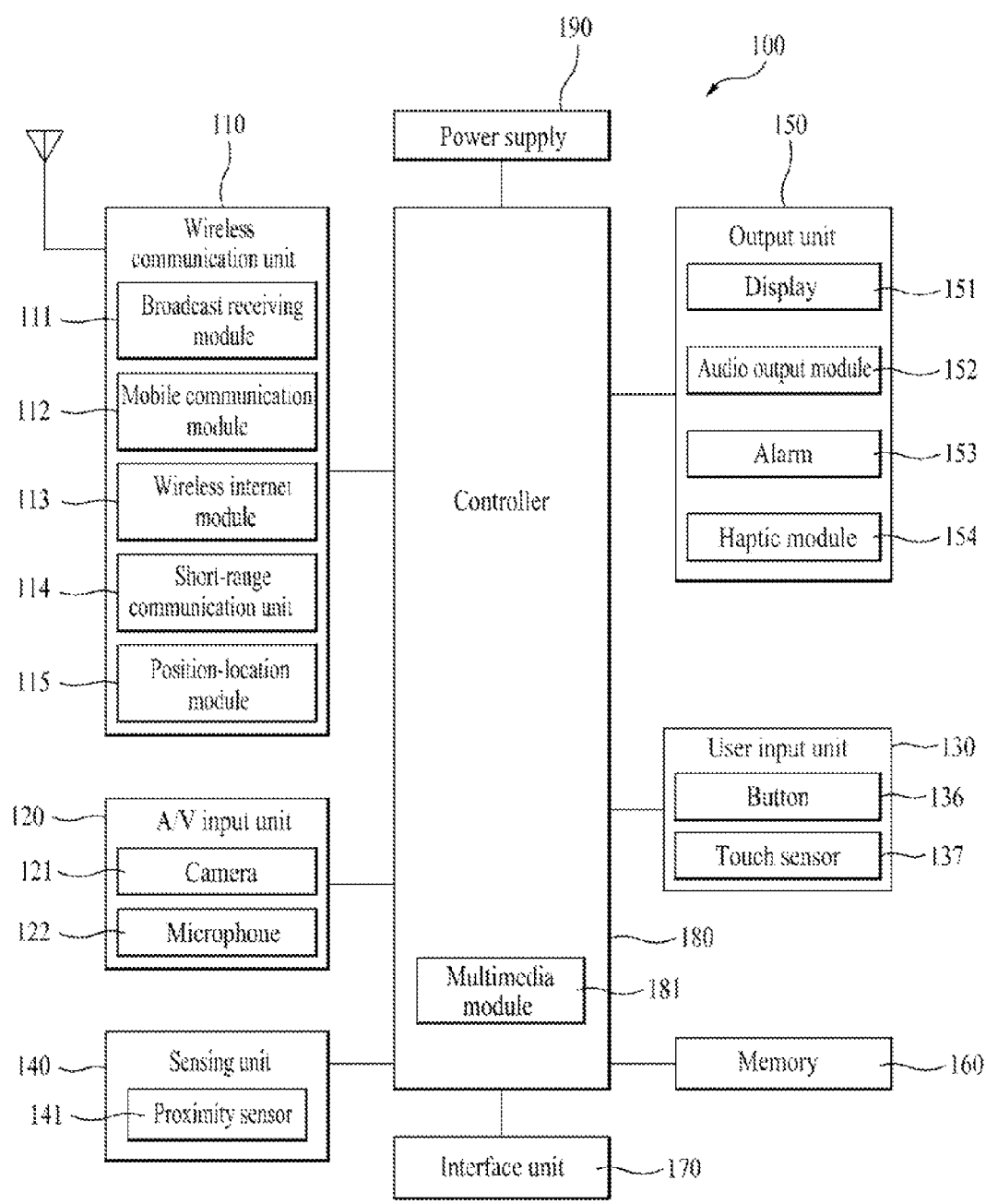
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. More or fewer components may be implemented according to various embodiments.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC (Near Field Communication), radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
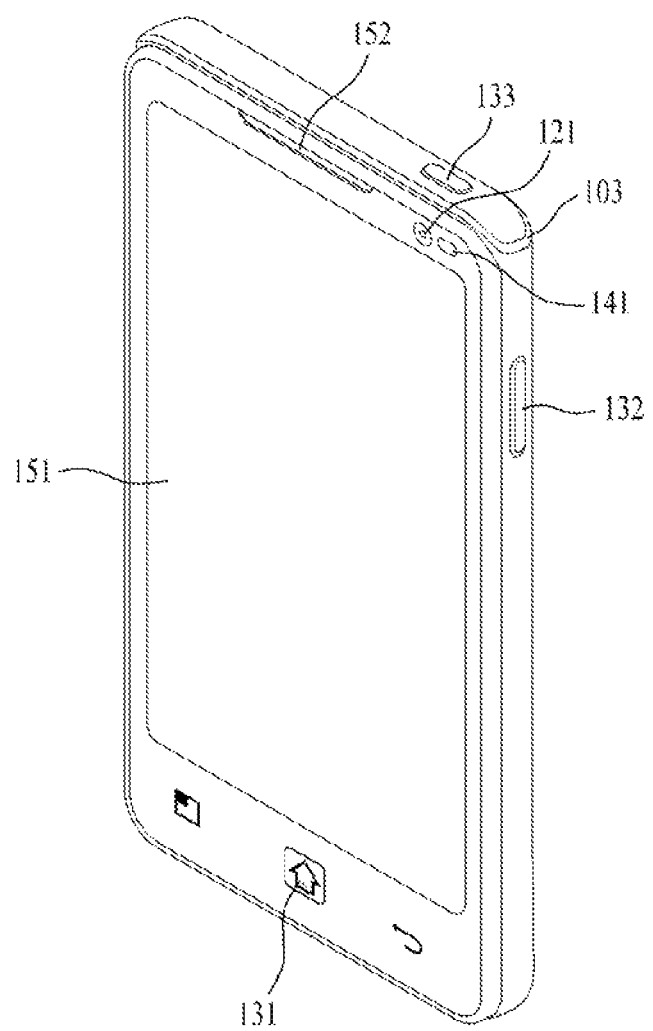
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
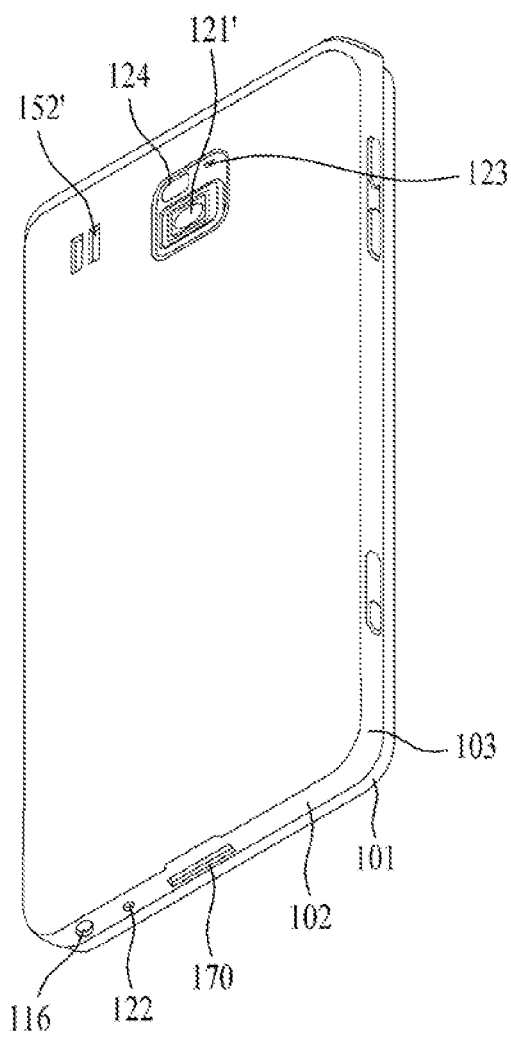
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, the visual information is viewable via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a controlling method implemented in the above-configured mobile terminal according to one embodiment of the present invention is explained with reference to FIGS. 4 to 6.

For clarity of the following description, assume that a mobile terminal mentioned in the following description includes at least one portion of the former components shown in FIG. 1. In particular, a mobile terminal according to the present embodiment necessarily includes the display 151 and the controller 180 among the former components shown in FIG. 1. If the display 151 includes a touchscreen, implementation of the mobile terminal according to the present invention may be further facilitated. Therefore, the following description is made on the assumption that the display 151 includes a touchscreen.

Figure 4:
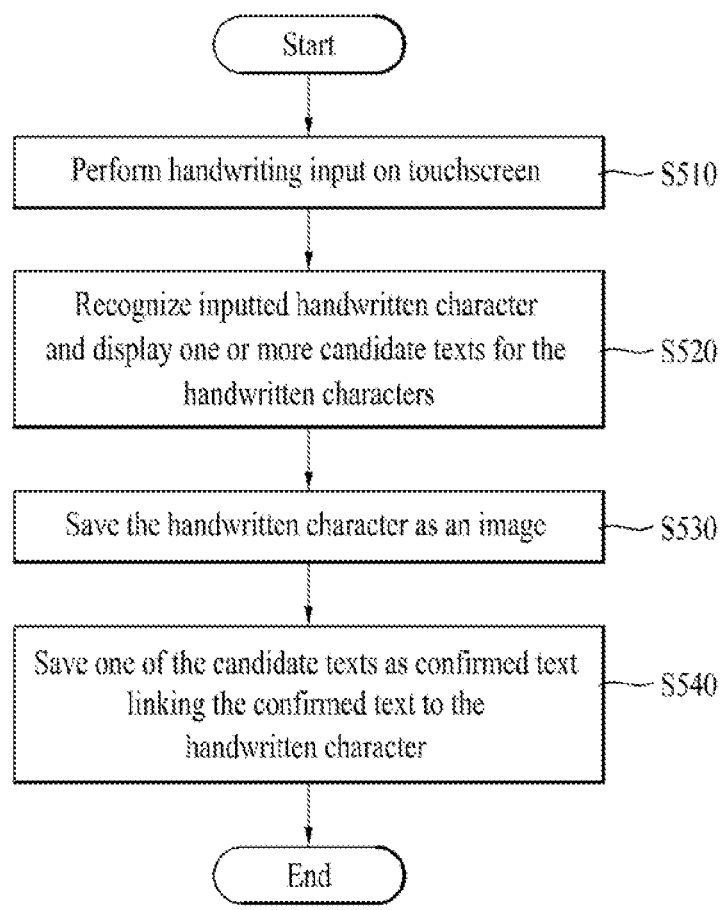
FIG. 4 is a flowchart for a method of controlling a mobile terminal according to one embodiment of the present invention.

FIG. 4 is a flowchart for a method of controlling a mobile terminal according to one embodiment of the present invention.

Referring to FIG. 4, a handwritten character is inputted to a touchscreen. According to the present invention, a handwritten character refers to an input character handwritten onto an input area of an input device. To this end, a handwriting input mode can be entered to enable a handwriting input in a mobile terminal.

The entry into the handwriting input mode may be achieved by one of a selection of a specific key button, a menu manipulation, a selection of a specific soft key on a touchscreen and the like. Alternatively, as a specific application is activated, a mobile terminal may be able to automatically enter a handwriting input mode. In this case, a basic input mode of the specific application may be previously set to the handwriting input mode and may be switched to a text input mode in response to a user command.

In the above-described handwriting input mode, a user performs a handwriting input on the touchscreen using a finger, a touch pen or the like. A handwriting-inputted content may be displayed on the touchscreen by real time.

When the handwritten character is inputted to the touchscreen, the controller recognizes the inputted handwritten character and may be then able to display at least one candidate text for the handwritten character by real time [S402].

The candidate text may indicate a text estimated as indicating the handwritten character inputted to the touchscreen. The candidate text differs from a confirmed text described later in being displayed on the touchscreen, instead of being saved in the mobile terminal, as soon as the handwritten character is inputted. By real time, the candidate text enables a user to see how a handwritten character currently inputted by the user is recognized by the controller.

There may exit at least one or more candidate texts. In case that an inputted handwritten character is recognized as a single text only, the controller may be able to extract a single candidate text only. On the other hand, in case that an inputted handwritten character can be recognized as several texts, the controller may be able to extract a plurality of candidate texts. In case that a plurality of the candidate texts are extracted, the controller may be able to set up a value that indicates how much each of the candidate texts is similar to the inputted handwritten character. In particular, the numerical value may become similarity of each of the candidate texts to the inputted handwritten character.

In the present step, when a single handwritten character is inputted to the touchscreen, the controller recognizes the inputted handwritten character and then extracts a text, which is estimated as indicating the handwritten character, as a candidate text. The controller may then display the extracted candidate text nearby the inputted handwritten character by real time.

In case that a plurality of handwritten characters are consecutively inputted, each time each of the handwritten characters is inputted, the controller displays a candidate text for each of the handwritten characters. For instance, each time a single handwritten character is inputted, the controller may be able to display a text, which is estimated as indicating the inputted handwritten character, by real time.

Subsequently, the controller saves the inputted handwritten character as an image [S403]. In particular, when a user command is detected, the controller may be able to save the handwritten character. For instance, the controller may be able to a whole handwritten character inputted page as an image. In doing so, when the handwritten character is inputted to a single page together with a drawing, both of the handwritten character and the drawing may be saved as a single image.

Alternatively, the controller may be able to separately save a handwritten character as an image. In case that a plurality of handwritten characters are inputted, the controller may be able to save each of the handwritten characters as a separate image or save the entire handwritten characters as a single image.

When an inputted handwritten character is saved as an image, the image may indicate an image file. In particular, the image file is discriminated from a text file, includes a file for saving graphics, and is mainly configured with shapes, lines and dots. Generally, the controller manages the image file in a manner of assigning 1 bit to a single pixel in the image file and then processing the corresponding bits. And, information related to graphics in the image file is not saved together with the image file.

On the other hand, the text file is the file in which characters and numbers are saved for the purpose of delivering a meaning to a counterpart. In the text file, a content of information to be delivered as a string of characters or numbers is saved together. In particular, in case that the same character is saved as an image file, the character is saved as graphics. Yet, in case that the same character is saved as a text file, a meaning of the character may be included in the text file together.

Thus, when the controller saves the handwritten character as the image, the controller saves one of the candidate texts as a confirmed text in a manner that corresponding candidate text is linked to the corresponding handwritten character [S404].

In this case, the confirmed text may indicate the text determined as corresponding to the handwritten character inputted to the touchscreen. Although the above-mentioned candidate text is displayed, the confirmed text is saved in the mobile terminal by being linked to the handwritten character. While the handwritten character is saved as the image in the mobile terminal, the confirmed text may be saved in the mobile terminal together. The confirmed text may be selected by the user or may be automatically determined by the controller.

One of at least one or more candidate texts displayed by real time on inputting the handwritten character may be determined as the confirmed text. In case that a single candidate text exists, it can become the confirmed text automatically. In case that a plurality of candidate texts exist, one of a plurality of the candidate texts can be determined as the confirmed text.

A confirmed text may be saved in a text database configured with at least one or more confirmed texts. In this case, a mapping information for specifying a corresponding handwritten character may be given to each of the confirmed texts saved in the text database. The controller may be able to control a confirmed text in the text database to match a handwritten character saved as an image using the mapping information. This shall be described in detail later.

In doing so, a page indicates a unit of screen displayed on the display when a handwritten character is inputted. A plurality of handwritten characters inputted to a single screen may be included in the same page. A set of the above-mentioned pages may create a single content. A plurality of pages may be included in a single content. And, a plurality of consecutively-created pages may configure a single content. In this case, the content may be saved as a sort of a multimedia file in the mobile terminal.

Alternatively, a confirmed text may be saved as side information on an image file having a handwritten character contained therein. For instance, a confirmed text for each handwritten character in an image file may be saved as a part of the image file by being tagged to the corresponding handwritten character.

Once the confirmed text is saved, the controller recognizes that the handwritten character linked to the confirmed text indicates the text. Since the confirmed texts one-to-one correspond to the handwritten characters, respectively, if a prescribed confirmed text is selected, a handwritten character matching the selected confirmed text may be specified.

According to the present embodiment, the controller is able to precisely specify a necessary handwritten character using a confirmed text without managing or searching for a handwritten character saved as an image. According to the present embodiment, despite that a handwritten character is saved as an image to maintain emotional sensibility of a cursive form, if a handwritten character is inputted to a mobile terminal without an additional job, a text corresponding to the handwritten character can be saved together, whereby user's convenience is enhanced.

Figure 5A:
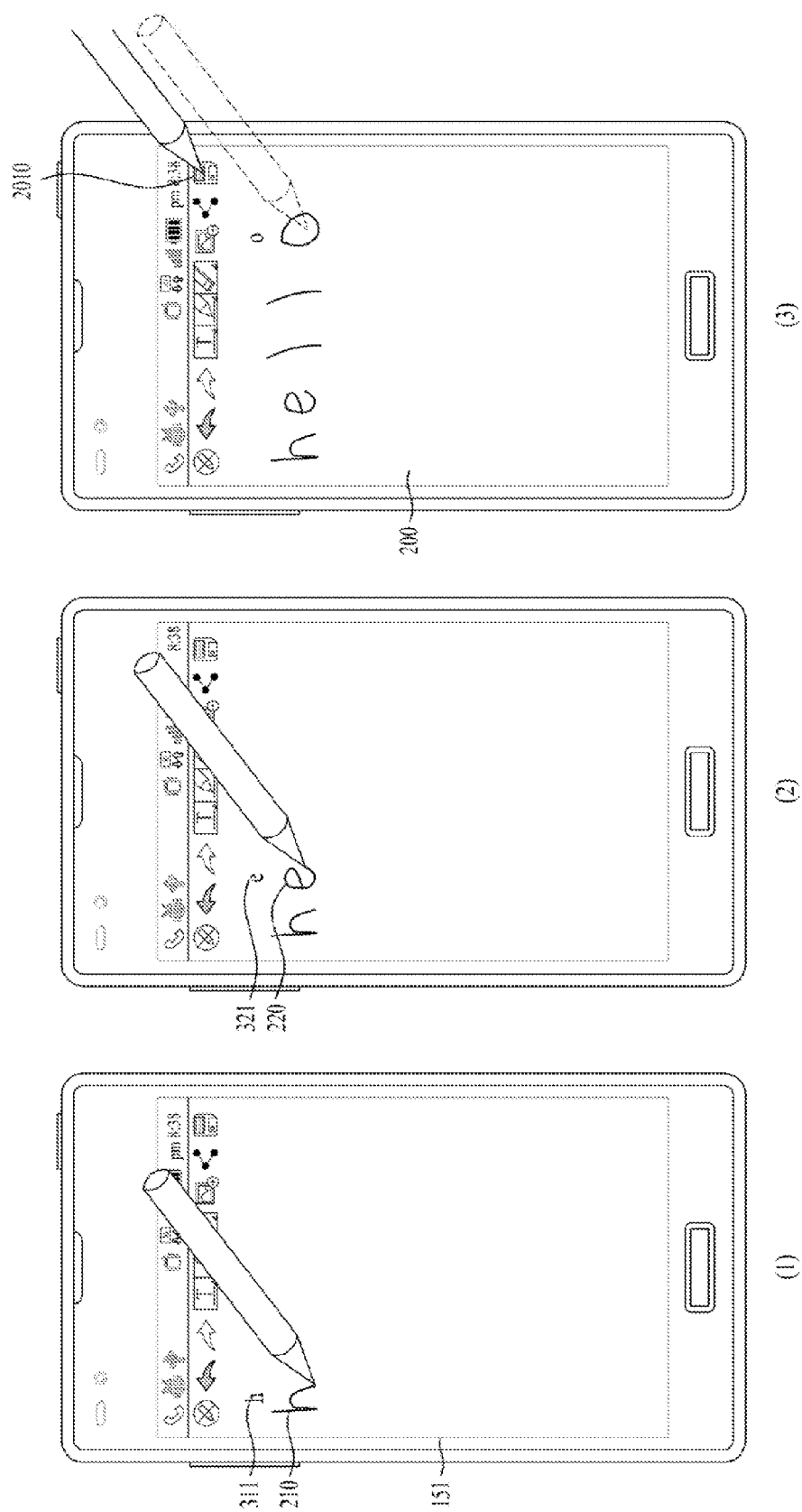
FIG. 5A and FIG. 5B are diagrams for one example of a method of controlling a mobile terminal according to one embodiment of the present invention.
Figure 5B:
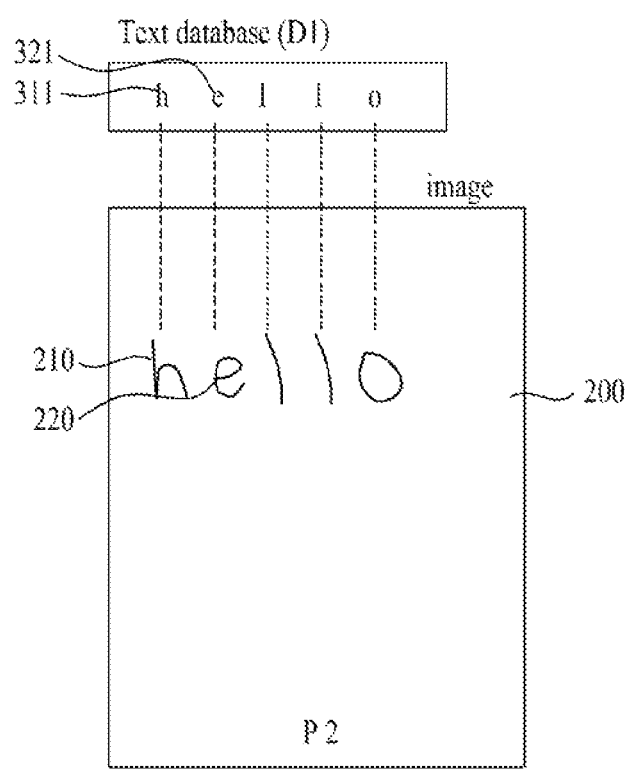

For instance, a mobile terminal according to the present embodiment may be able to operate in a manner shown I FIG. 5A and FIG. 5B. In particular, FIG. 5A shows a diagram for one example of operation of the mobile terminal according to the present invention. And, FIG. 5B shows a configuration of an image file saved as a result of the operation of the mobile terminal according to the present embodiment.

FIG. 5A shows a case that a single candidate text is displayed for each handwritten character. The controller may be able to control one text having a highest similarity to an inputted handwritten character to be displayed as a candidate text. Since a single candidate text is set to be displayed in the embodiment shown in this drawing, the displayed candidate text can be automatically determined as a confirmed text.

Referring to FIG. 5A (a), a handwritten character 210 indicating a letter 'h' can be first inputted to the touchscreen. The controller recognizes the handwritten character 210 by real time and then controls a text (i.e., a candidate text) 311, which is estimated as indicated by the handwritten character 210, to be displayed above the handwritten character 210. If the handwritten character 210 is completed, the controller determines the displayed text 311 as a confirmed text corresponding to the handwritten character 210.

Once another handwritten character starts to be inputted, the controller 180 may control the displayed text 311 to be temporarily saved in a manner of being linked to the handwritten character 210. This is to save the text 311 as the confirmed text in conjunction with the handwritten character 210 when the handwritten character 210 is saved as an image after completion of the handwriting input. For instance, the controller may control the text 311 to be saved in a temporary storage unit of the memory together with mapping information on the handwritten character 210. After the handwriting input has been completed, when the handwritten character 210 is saved as the image, the text 311 is saved as the confirmed text. Yet, if the handwritten character 210 is not saved, the text 311 may be deleted.

Subsequently, referring to FIG. 5A (2), a handwritten character 220 indicating a letter 'e' may be consecutively inputted to the touchscreen. The controller recognizes the handwritten character 220 by real time and then controls a candidate text 312 for the handwritten character 220 to be displayed above the handwritten character 220. The text 312 can be determined as c confirmed text corresponding to the handwritten character 220. As a result, the controller may be able to control the text 312 to be temporarily saved.

Referring to FIG. 5A (3), as handwritten characters respectively indicating letters 'l', 'l' and 'o' are sequentially inputted to the touchscreen, if the handwriting is completed, a command for saving the inputted handwritten characters as an image can be inputted. If an icon 2010 for a save command is touched, as shown in FIG. 5A (3), the controller 180 may control a page 200, which contains the handwritten character 210, the handwritten character 220 and other handwritten characters, to be saved as an image.

FIG. 5B shows a configuration of the saved page 200. Referring to FIG. 5B, when the page 200 is saved as the image, the controller may be able to control a confirmed text linked to each of the handwritten characters to be saved in a text database D1. The texts temporarily saved in accordance with the completion of each of the handwritten characters are saved as the confirmed texts in the text database D1. In particular, the text 311 for the handwritten character 210 is saved as the confirmed text, the text 322 for the handwritten character 220 is saved as the confirmed text, and the texts corresponding to the rest of the handwritten characters are saved as the confirmed texts, respectively.

In doing so, the confirmed texts are linked to the corresponding handwritten characters, respectively. As a result, if the confirmed text in the text database D1 is specified, the handwritten character corresponding to the specified confirmed text can be automatically specified.

As mentioned in the foregoing description, the controller may control mapping information, which links each confirmed text to a corresponding handwritten character, to be further saved. In case that a confirmed text is saved in form of database, the mapping information may be saved in the database together with each corresponding confirmed text. IN this case, the mapping information may include at least one of location information of each handwritten character in a saved page, location information of the saved page in a content file containing the saved page, and a user ID.

FIG. 6 is a diagram for one example of a text database for storing a confirmed text extracted by the embodiment shown in FIG. 5. In particular, FIG. 6 shows one example of the text database D1 including the mapping information.

Referring to FIG. 6, each confirmed text (e.g., 'h', 'e', etc.) is saved in a confirmed text field within the text database D1. In this case, the text database D1 may further include a coordinates field in a page, a location field of the page, a user ID field and the like.

A coordinated value for each confirmed text may be saved in the coordinates field in the page. In this case, the coordinates value indicates a location of a handwritten character in the page containing the handwritten character corresponding to the each confirmed text. In the page location field, a unique number of a content for the each confirmed text and a unique page number in the content can be saved. In this case, the content indicates a file including the page that contains the handwritten character corresponding to the each confirmed text. And, the content may include a multimedia file configured with a plurality of images. Moreover, the content may vary depending on a type of an application used for a handwritten character input. In the user ID, a unique ID of a person having inputted the handwritten character corresponding to the each confirmed text may be saved. In this case, it may be able to extract the ID using information for a login to the application used for the handwritten character input.

For instance, the confirmed text 'h' and the mapping information corresponding to the confirmed text 'h' are saved in a first row of the text database D1 shown in FIG. 6. In this case, the confirmed text 'h' it the text corresponding to the former handwritten character 210 shown in FIG. 5B. In particular, a value of a coordinates field (3, 6) in the page indicates a location of the handwritten character 210 in Page P2 shown in FIG. 5B. A value 'Note 1, P2' of a location field in the page indicates that the handwritten character 210 is contained in a second page of a content file named Note 1. And, a value 'A' saved in the user ID field indicates that the handwritten character 210 is inputted by a user A.

If both a confirmed text and a mapping information are saved together, as shown in FIG. 6, it may be able to effectively specify a handwritten character corresponding to the confirmed text among all handwritten characters saved in the mobile terminal in a manner of specifying the confirmed text only. As a result, it may be unnecessary for search all the saved images for a handwritten character indicating a specific content one by one.

In the following description, various embodiments or examples related to a case of displaying a plurality of candidate texts on inputting a handwritten character are explained with reference to FIG. 7A and FIG. 7B.

Figure 7A:
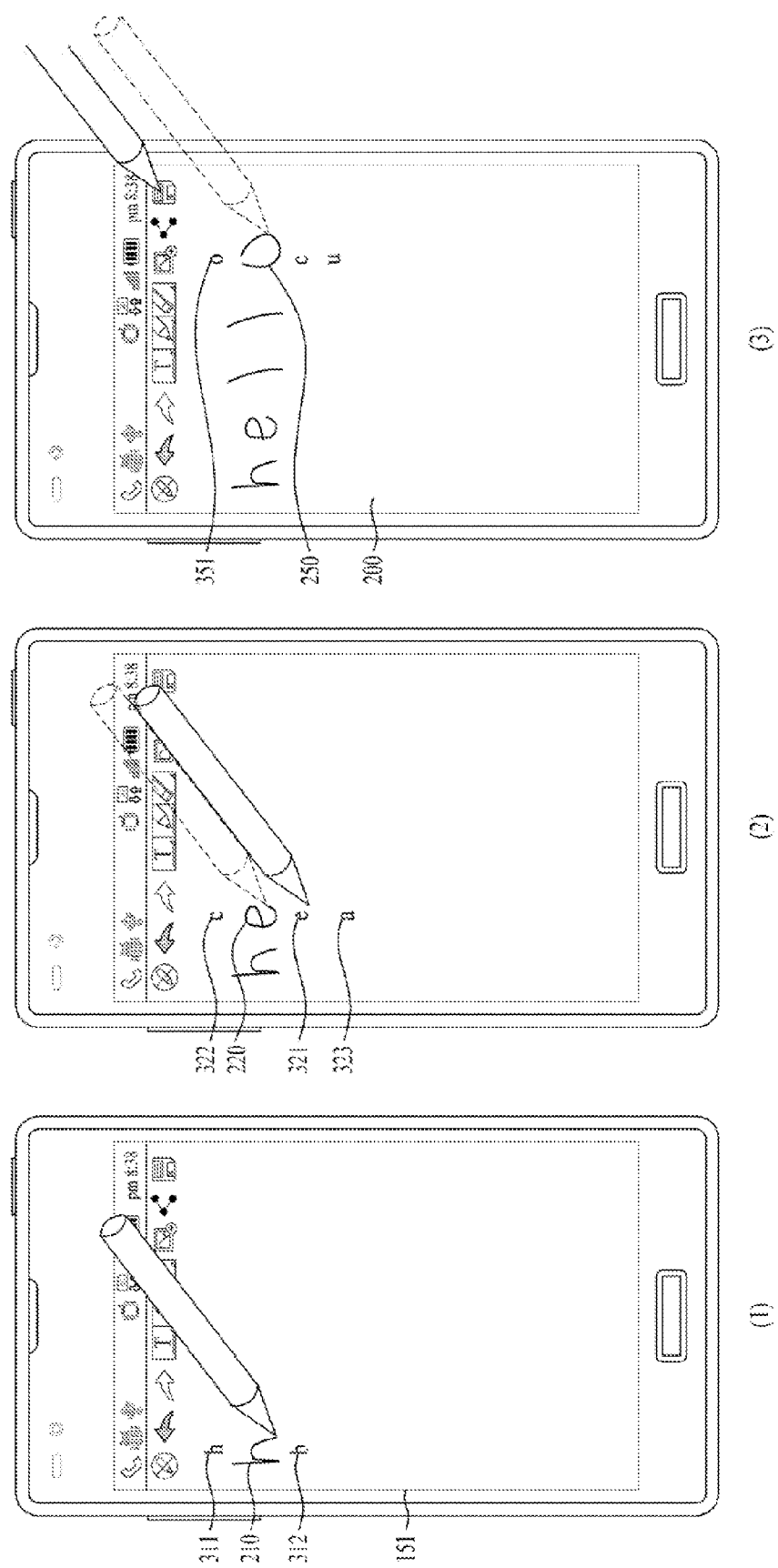
FIG. 7A and FIG. 7B are diagrams for one example of a method of controlling a mobile terminal according to another embodiment of the present invention.
Figure 7B:
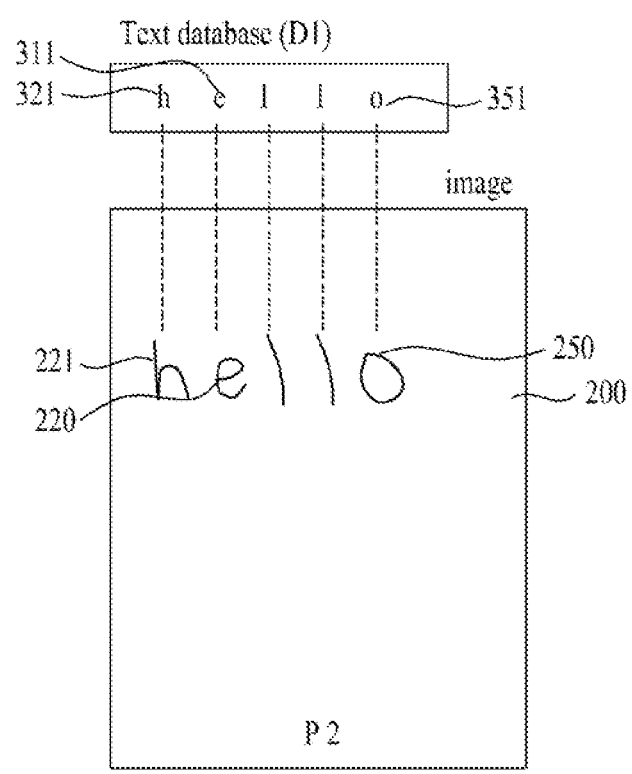

FIG. 7A and FIG. 7B are diagrams for one example of a method of controlling a mobile terminal according to another embodiment of the present invention. In particular, FIG. 7A shows one example of an operation of a mobile terminal when a plurality of candidate texts are displayed. And, FIG. 7B shows a configuration of an image file saved as a result of the operation.

According to the present embodiment, a controller may control a plurality of candidate texts, each of which has a different similarity for a handwritten character inputted to a touchscreen, to be displayed in order of the similarity. As mentioned in the foregoing description, in case that an inputted handwritten character is recognizable as several texts, the controller extracts a plurality of candidate texts and may be able to set a similarity of each of the candidate texts to a numerical value. In doing so, the controller displays a plurality of the candidate texts all in order of the similarity.

Thus, in case that a plurality of candidate texts are displayed for a single handwritten character, one of a plurality of the candidate texts is determined and saved as a confirmed text. According to one embodiment, the controller recognizes a text selected by a user from a plurality of candidate texts as a confirmed text and then controls it to be saved as an image by being linked to a saved handwritten character. In doing so, in case that another handwritten character is inputted without an input of selecting one of a plurality of the candidate texts, the controller may control the candidate text, which has a highest similarity to the corresponding handwritten character among a plurality of the candidate texts, to be saved as a confirmed text.

In particular, referring to FIG. 7A (1), a handwritten character 210 may be inputted to a touchscreen. A controller may be able to recognize a shape of the handwritten character 210 as 'h' or 'b'. As a result, the controller may extract two candidate texts 3211 and 312. In doing so, a similarity of each letter to the handwritten character 210, which is determined by the controller, may be ranked higher in order of 'h' and 'b'. Hence, if the handwritten character 210 is completed, as shown in FIG. 7A (1), the controller controls the text 311 indicating the letter 'h' to be displayed above the handwritten character 210 and also controls the text 312 indicating the letter 'b; to be displayed below the handwritten character 210, in order.

Subsequently, referring to FIG. 7A (2), a user may be able to start to consecutively input a handwritten character 220 indicating a letter 'e' to the touchscreen without performing an action of selecting one of the candidate texts 311 and 312. In this case, the controller may determine the text 311, which is the candidate text having the highest similarity to the handwritten character 210, as a confirmed text and may then control the text 311 to be temporarily saved by being linked to the handwritten character 210.

For the inputted handwritten character 220 shown in FIG. 7A (2), the controller recognizes a shape of the handwritten character 220 as letters 'c', 'e' and 'a' and is then able to extract three candidate texts 321 to 323. In this case, each of the letters determined by the controller may have similarity higher in order of 'c'→'e'→'a'. As a result, a text 322 indicating the letter 'c' may be displayed above the complete handwritten character 220, a text 321 indicating the letter 'e' may be displayed below the complete handwritten character 220, and a text 323 may be displayed below the text 321.

While the texts 321 and 323 are displayed all, if a user starts to input another handwritten character, the controller may determine the text 322, which is determined as having the highest similarity, as a confirmed text. Yet, the text 322 does not indicate the letter the user intends to input. Hence, referring to FIG. 7A (2), after the input of the handwritten character 220 has been completed, the user may be able to touch and select the text 321 indicating the letter the user intends to input. Since the text 321 is selected from a plurality of the candidate texts, the controller determines the text 321 as a confirmed text for the handwritten character 220 and may be then able to control it to be temporarily saved.

Referring to FIG. 7A (3), if a handwriting input is ended by sequentially inputting handwritten characters respectively indicating letters 'l', 'l' and 'o' to the touchscreen, a command for saving the inputted letters as an image may be inputted. If an icon 2010 for a save command is touched, as shown in FIG. 7A (3), the controller may control a page, which contains the handwritten character 210, the handwritten character 220 and other handwritten characters, to be saved as an image.

In FIG. 7A (3), one of candidate texts for the handwritten character 250 indicating the letter 'o' is not selected by the user but the save icon 2010 may be touched. If so, the controller may control the candidate text 351, which is recognized as having the highest similarity to the handwritten character 250, to be automatically saved as a confirmed text.

FIG. 7B shows a configuration of the saved page 200 shown in FIG. 7A (3).

Referring to FIG. 7B, when the controller saves the page 200 as the image, the controller may control the confirmed texts, which are linked to the corresponding handwritten characters, respectively, to be saved in a text database D1. As mentioned in the foregoing description, each of the saved confirmed texts may include the candidate text 311/351 determined as having the highest similarity to the inputted handwritten character or the text 321 selected from the displayed candidate texts by the user.

According to the present embodiment, a mobile terminal may be able to provide a real-time correction function of correcting a character recognized by real time when a user performs a handwriting input. Using this function, the user is able to correct a case that a character inputted by handwriting is recognized as a wrong letter as soon as inputs the corresponding character. As a result, a confirmed text exactly matching a content indicated by the handwritten character can be created and saved.

In the above description so far, when a handwritten character is inputted, a method of recognizing the handwritten character by real time and saving a confirmed text linked to each handwritten character is explained. In the following description, various embodiments of a method of searching for a handwritten character saved as an image using the saved confirmed text are explained with reference to FIGS. 8 to 10.

Figure 8:
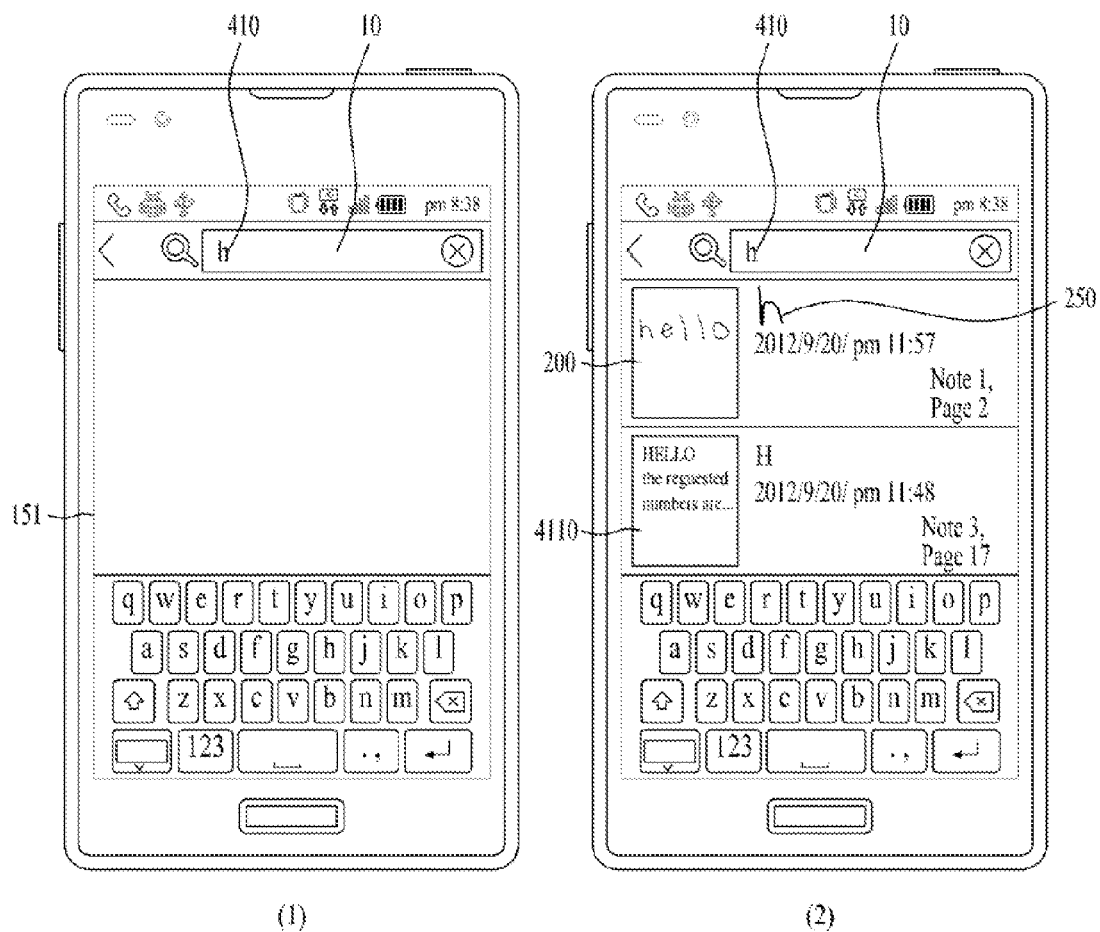
FIG. 8 and FIG. 9 are diagrams for various examples of a method of searching a mobile terminal for a handwritten character saved as an image according to another embodiment of the present invention.
Figure 9:
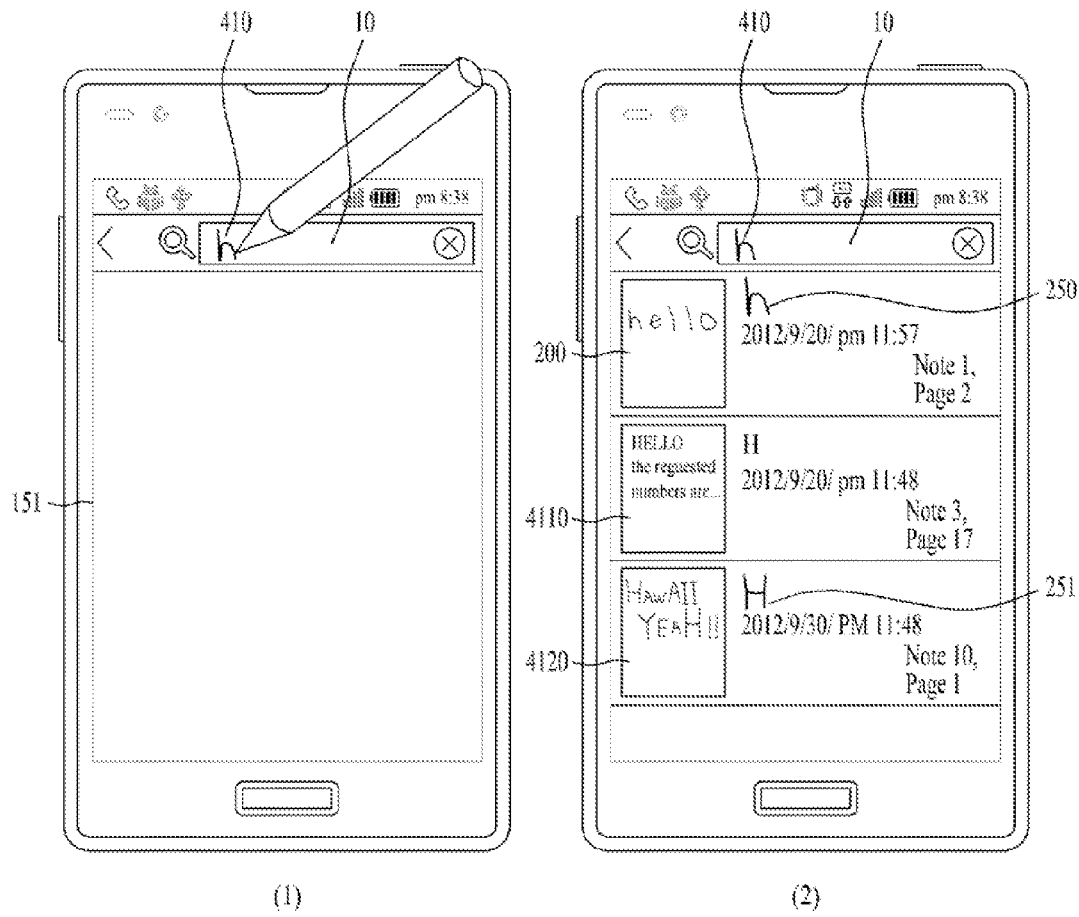

FIG. 8 and FIG. 9 are diagrams for various examples of a method of searching a mobile terminal for a handwritten character saved as an image according to another embodiment of the present invention.

FIG. 8 shows one example of a case that a search word is inputted as a text.

According to the present embodiment, if a search word is inputted as a text to a first region, a controller is able to search confirmed texts, which are saved by being linked to a saved image, for a confirmed text corresponding to the search word. Subsequently, the controller may be able to control a handwritten character, which corresponds to the found confirmed text, to be displayed as an image.

The first region is the region set to enable a user to input a letter for which a user desires to search a file, a history record or the like saved in a mobile terminal and may include a search window region for example. According to the present embodiment, a search word may be inputted as a text to the first region via a keyboard.

If a search word configured with a text is inputted to the first region, the controller searches previously-saved confirmed texts for a text that matches the search word. If the confirmed text matching the search word exists, it may be able to specify a handwritten character saved as an image. In this case, the specified handwritten character represents the same letter of the search word inputted to the first region. Thus, if the handwritten character having the same content of the search word is found, as a result of the search, the controller controls the found handwritten character to be displayed as an image. The controller displays a page containing the handwritten character, thereby enabling the handwritten character to be viewed by the user.

For instance, the mobile terminal according to the above embodiment may operate in a manner shown in FIG. 8. Referring to FIG. 8 (1), the user may be able to input a search word 'o' as a text 410 to a first region 10 corresponding to a search window region. If the text 'o' 410 is inputted, the controller may be able to search a text database D1 (cf. FIG. 6) for a confirmed text matching 'o'. The controller may find the 'o' from confirmed texts saved in the text database D1 and may be then able to specify a handwritten character corresponding to the confirmed text. In particular, the handwritten character may be contained in the Page 2 of the Note 1, as shown in FIG. 6.

As a result of the search in response to the input, referring to FIG. 8 (2), the controller may be able to display a page, which contains the corresponding handwritten character. In particular, the controller displays the Page 2 200 of the Note 1 and also controls the specified handwritten character 250 to be viewed by being enlarged, simultaneously. Moreover, referring to FIG. 8 (2), a different page 4110 containing the text 'o' in direct may be displayed as well.

According to the present embodiment, a user inputs a search word text and is then able to search handwritten characters saved as an image for a handwritten character indicating the same content of the search word. As a result, a time and accuracy of a search for a handwritten character saved as an image are enhanced, whereby availability of the handwritten character saved as the image can be enhanced.

Similarly, one example of a case of inputting a search word as a handwritten character is shown in FIG. 9.

According to the present embodiment, if a search word is inputted to a first region by handwriting, a controller is able to search confirmed texts, which are saved by being linked to a saved image, for a confirmed text corresponding to the search word. Subsequently, the controller may be able to control a handwritten character, which corresponds to the found confirmed text, to be displayed as an image.

According to the present embodiment, a search word may be inputted to a first region by handwriting. To this end, the first region may include a region on which a handwriting input can be performed. In case that a first region includes a search window region, a search window may be configured in a manner that a user is able to directly perform a handwriting input on the search window region. If the handwriting input is directly performed on the search window, user's convenience can be enhanced.

If a search word is inputted to a first region by handwriting, a controller recognizes the handwriting-inputted search word and then determines a confirmed text corresponding to the search word. Since a process for determining the confirmed text is identical to the former process mentioned in the foregoing description, its details shall be omitted from the following description.

Once the confirmed text of the search word is determined, the controller searches previously-saved confirmed texts for a text matching the confirmed text of the search word. In case that confirmed texts match each other, different handwritten characters corresponding to the confirmed text may represent the same letter. In case that one confirmed text matching the confirmed text of the search word is found, the controller displays a handwritten character corresponding to the found confirmed text as a result of the search.

For instance, a mobile terminal according to the above embodiment may operate in a manner shown in FIG. 9.

Referring to FIG. 9 (1), a user may be able to directly input a handwritten character 410 indicating a letter 'h' to a first region 10 that is a search window region. If the handwritten character 410 is inputted, a controller recognizes the handwritten character 410 by real time and may be then able to determine a corresponding confirmed text. If the confirmed text of the handwritten character 410 is determined as a text 'h', the controller may be able to search a text database D1 (cf. FIG. 6) for a confirmed text matching 'h'.

If the controller finds 'h' from confirmed texts saved in the text database D1, a handwritten character corresponding to the confirmed text can be specified. In particular, the handwritten character may be contained in the Page 2 of the Note 1, as shown in FIG. 6. As a result of the search for the input, referring to FIG. 9 (2), the controller may be able to display a page 200 containing the handwritten character corresponding to the found confirmed text.

In doing so, referring to FIG. 9 (2), another page 4110 directly containing a text 'h' may be displayed together as a result of the search for the input. In addition, another page 4120 containing another handwritten character 251 having the text 'h' as a confirmed text may be further displayed. This corresponds to a case that a plurality of confirmed texts matching the text 'h' are found from the text database D1. In case that a plurality of confirmed texts matching a confirmed text of a search word are found, the controller may control all the handwritten characters 250 and 251 specified by the confirmed texts to be displayed as images, respectively.

According to the present embodiment, a user inputs a search word by handwriting and is then able to search for a handwritten character representing the same letter of the handwritten character.

Figure 10:
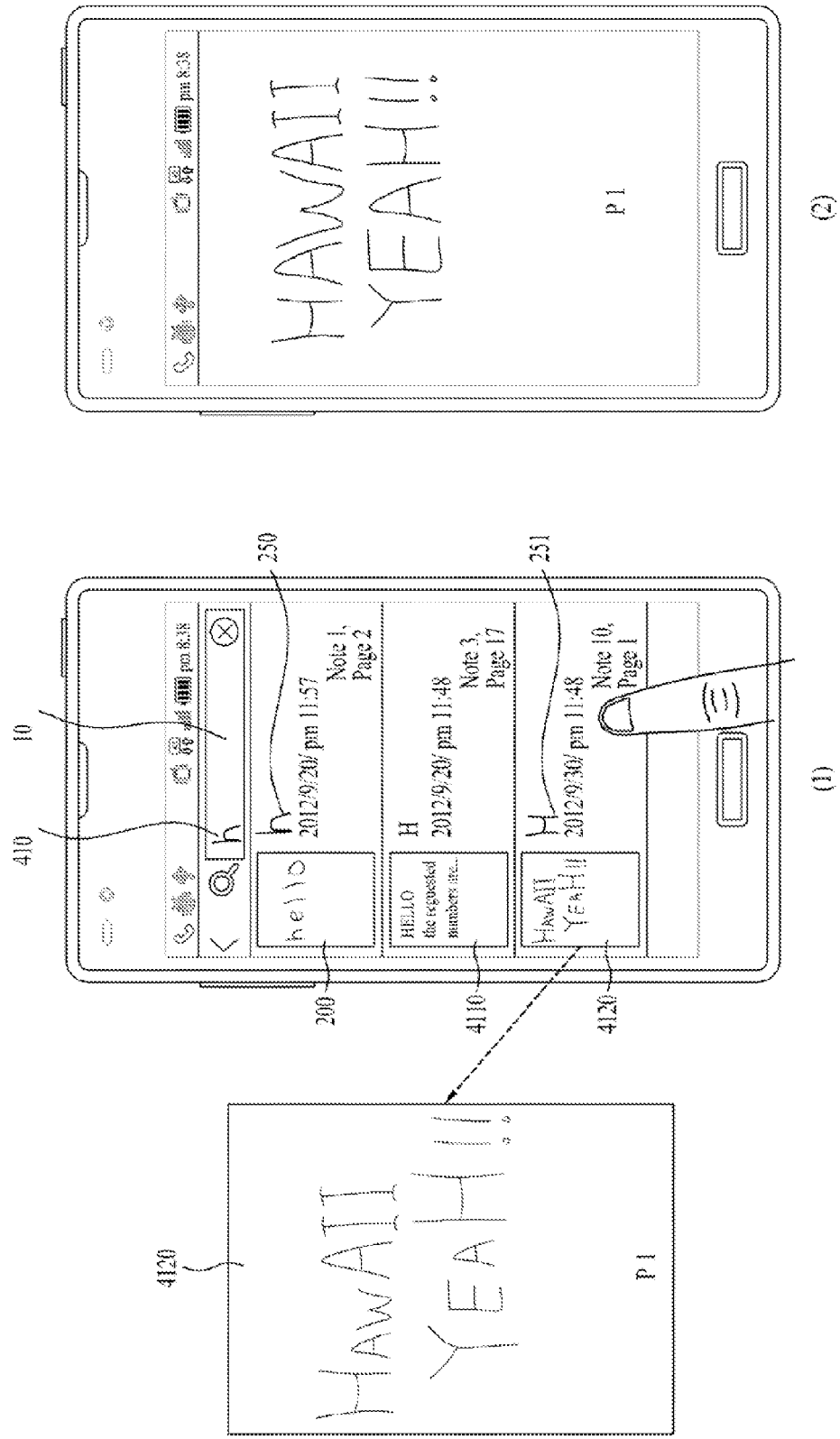
FIG. 10 is a diagram for one example of a method of displaying a handwritten character in a mobile terminal by normalizing a handwritten character size on a searched page.

Meanwhile, when a page containing the above-found handwritten character is displayed, FIG. 10 shows one example of a case that a size of the handwritten character in the page is adjusted.

According to one embodiment, when a page containing a handwritten character corresponding to a found confirmed text is displayed, a controller may control the handwritten character in the page to be displayed in a manner that a size of the handwritten character is normalized.

In a page containing a found confirmed text, a handwritten character different from a handwritten character of the found confirmed text may be included as well. When a page containing the handwritten character corresponding to the found confirmed text is displayed, the controller adjusts a size of the handwritten character contained in the page to become similar and then displays the corresponding page. To this end, handwritten characters contained in the page may be saved as individual images, respectively. The controller measures sizes of the images of the handwritten characters and then enlarges/reduces to display the handwritten character images in a manner that each of the sizes of the handwritten character images becomes similar to a preset size.

For instance, referring to FIG. 10 (1), a plurality of pages 200, 4110 and 4120 may be displayed as thumbnails as a result of a search for a search word inputted to a first region, respectively. In doing so, referring to the enlarge drawing shown in FIG. 10 (1), a plurality of handwritten characters in different sizes may be contained in Page 1 4120 of Note 10.

Referring to FIG. 10 (1), a user may be able to select a corresponding region to view the Page 1 4120 of Note 10 by zoom-in. In response to a command for the selection, the controller controls the page 4120 to be displayed on a full screen of the touchscreen. In doing so, referring to FIG. 10 (2), the controller may be able to control the handwritten characters contained in the page 4120 to be displayed in a manner that sizes of the handwritten characters are normalized. Comparing FIG. 10 (1) to FIG. 10 (2), if sizes of handwritten characters are normalized, a corresponding page may become further readable and esthetic.

According to the present embodiment, handwritten characters inputted by a user may be displayed in a manner that sizes of the handwritten characters in a page are normalized. If handwritten characters are inputted fast despite being consecutively inputted, they may have different sizes. According to the present embodiment, when a user searches to view the handwritten meeting records or the like, a letter size is normalized to make a handwritten page become further readable and esthetic.

In the following description, various embodiments for a case that a portion of handwritten characters saved as an image is substituted with different handwritten character(s) are explained with reference to FIGS. 11 to 13.

Figure 11:
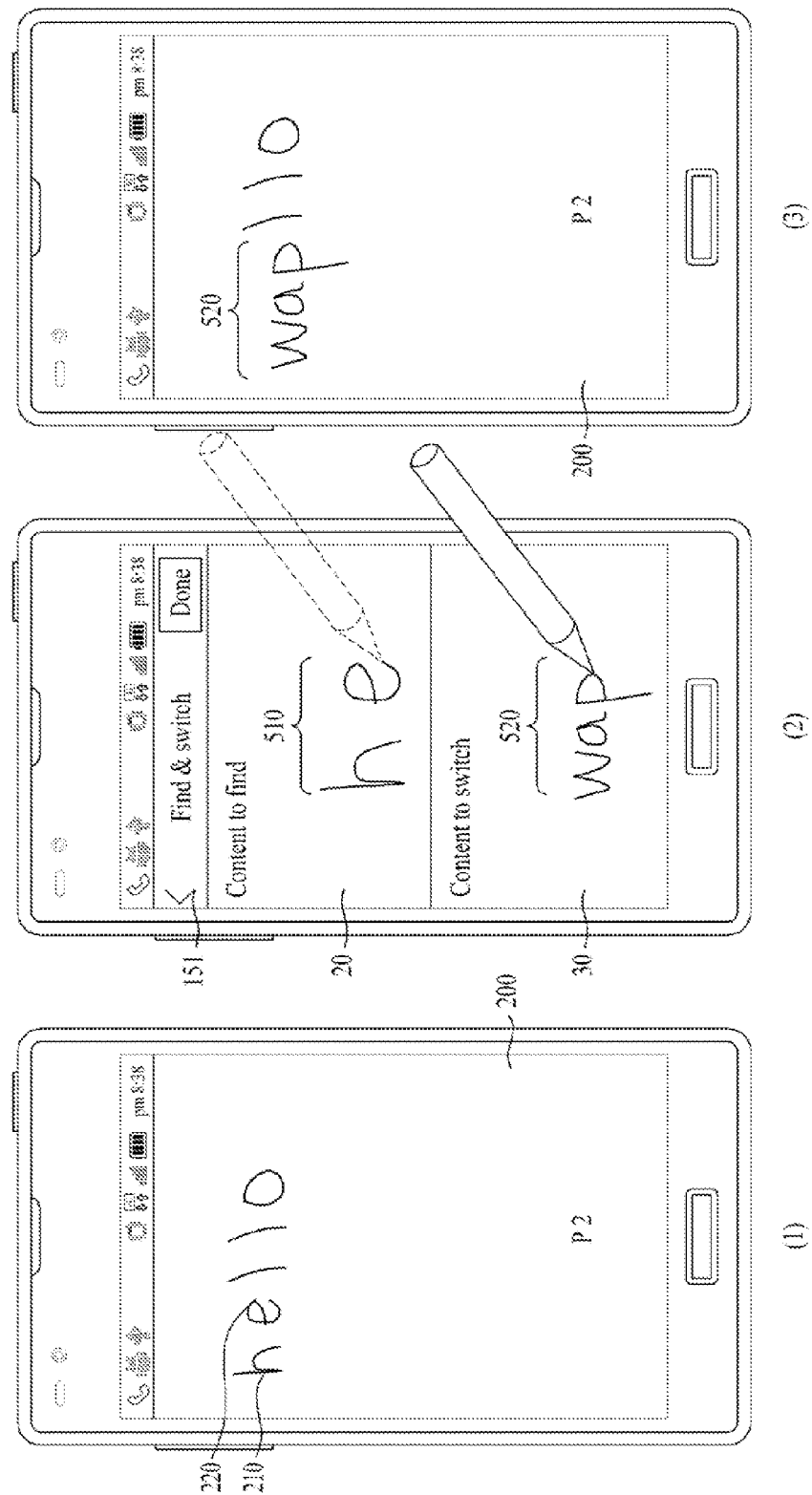
FIG. 11 is a diagram for one example of a method of substituting some of handwritten characters saved as image(s) with handwritten character(s) of different contents according to another embodiment of the present invention.

FIG. 11 shows one example of a case that some of handwritten characters saved as image(s) are substituted with handwritten character(s) of different contents. FIG. 12 and FIG. 13 show various examples of a case that some of handwritten characters saved as image(s) are substituted with different handwritten character(s) of the same letter(s).

According to one embodiment, if a user command is detected, a controller may be able to substitute a first handwritten character saved as an image with a second handwritten character. In this case, the first handwritten character may include a portion of a plurality of handwritten characters saved as an image in a mobile terminal. For instance, the first handwritten character may include a specific word or character in a handwritten character string. The second handwritten character is discriminated from the first handwritten character and may include a newly inputted handwritten character or a different character previously saved as an image. The first handwritten character and the second handwritten character may one-to-one correspond to each other.

According to the present embodiment, in order to substitute only the first handwritten character corresponding to a portion of the handwritten characters previously saved as the image with the second handwritten character, each handwritten character may be saved as a separate image. For instance, in case that a page containing a plurality of handwritten characters is saved, a plurality of the handwritten characters contained in the page can be saved as individual images, respectively. The controller may be able to substitute the first handwritten character with the second handwritten character in a manner of deleting a handwritten character image corresponding to the first handwritten character among a plurality of the handwritten characters and then inserting a handwritten character image into the corresponding position.

If a command for substituting a handwritten character with a second handwritten character is inputted, the controller may be able to use a confirmed text saved by being linked to a previously saved handwritten character in order to search the previously saved handwritten characters for the first handwritten character. As mentioned in the foregoing description of the former embodiment, if a text or handwritten character specifying a first handwritten character is inputted, the controller may be able to search previously saved confirmed texts for a confirmed text matching a confirmed text of the inputted text or handwritten character. The controller specifies a handwritten character corresponding to the found confirmed text as the first handwritten character and may be then able to track a location of the first handwritten character.

For instance, referring to FIG. 11, a first handwritten character and a second handwritten character may include handwritten characters representing different letters, respectively. In particular, the first handwritten character includes a handwritten character having the same confirmed text of a search word inputted to a mobile terminal and the second handwritten character may include a newly inputted substitute word. According to one embodiment, the search word may include a handwritten character inputted by handwriting to a second region displayed on a touchscreen and the substitute word may include a handwritten character inputted by handwriting to a third region displayed on the touchscreen.

In particular, a page 200 shown in FIG. 11 (1) may be created in response to a handwriting input. In a mobile terminal having the page 200 saved therein, referring to FIG. 11 (2), if a 'find and switch' menu is activated, both a second region 20 and a third region 30 may be simultaneously displayed on a touchscreen. In this case, the second region 20 is a region for inputting a search word for which saved handwritten characters will be searched. And, the third region 30 may include a region for inputting a substitute word with which the search word will be substituted. Referring to FIG. 11 (2), handwritten characters indicating 'he' may be inputted as a search word 510 to the second region 20, while handwritten characters indicating 'wap' may be inputted as a substitute word 520 to the third region 30.

Once the input is completed, the controller may be able to determine confirmed text(s) corresponding to the search word 510 inputted to the second region 20. If the confirmed texts corresponding to the search word 510 are determined as a text 'h' and a text 'e', the controller may be able to search a text database D1 (cf. FIG. 6) for confirmed texts matching the text 'h' and the text 'e', respectively. If the confirmed texts matching the text 'h' and the text 'e' are found, the controller may be able to specify handwritten characters 210 and 220 corresponding to the found confirmed texts, respectively. In this case, the specified handwritten characters include the handwritten characters corresponding to the search word 510, respectively.

Thus, once the handwritten characters corresponding to the search word 510 are specified, referring to FIG. 11 (3), the controller deletes the handwritten character image and may be then able to insert the inputted handwritten characters as a substitute word 520 into the corresponding positions. To this end, the controller may control the handwritten characters inputted to the third region 30 to be saved as an image. As a result, the partial handwritten characters 210 and 220 corresponding to the search word on the page formed by handwriting input may be substituted with the substitute word 520.

According to the present embodiment, handwritten characters representing the same content of a search word among handwritten characters previously saved as an image in a mobile terminal may be collectively substituted with a substitute word. As a result, a 'find & switch' function can be implemented for handwritten characters saved as an image, whereby a page created by handwriting input can be further utilized.

Figure 12:
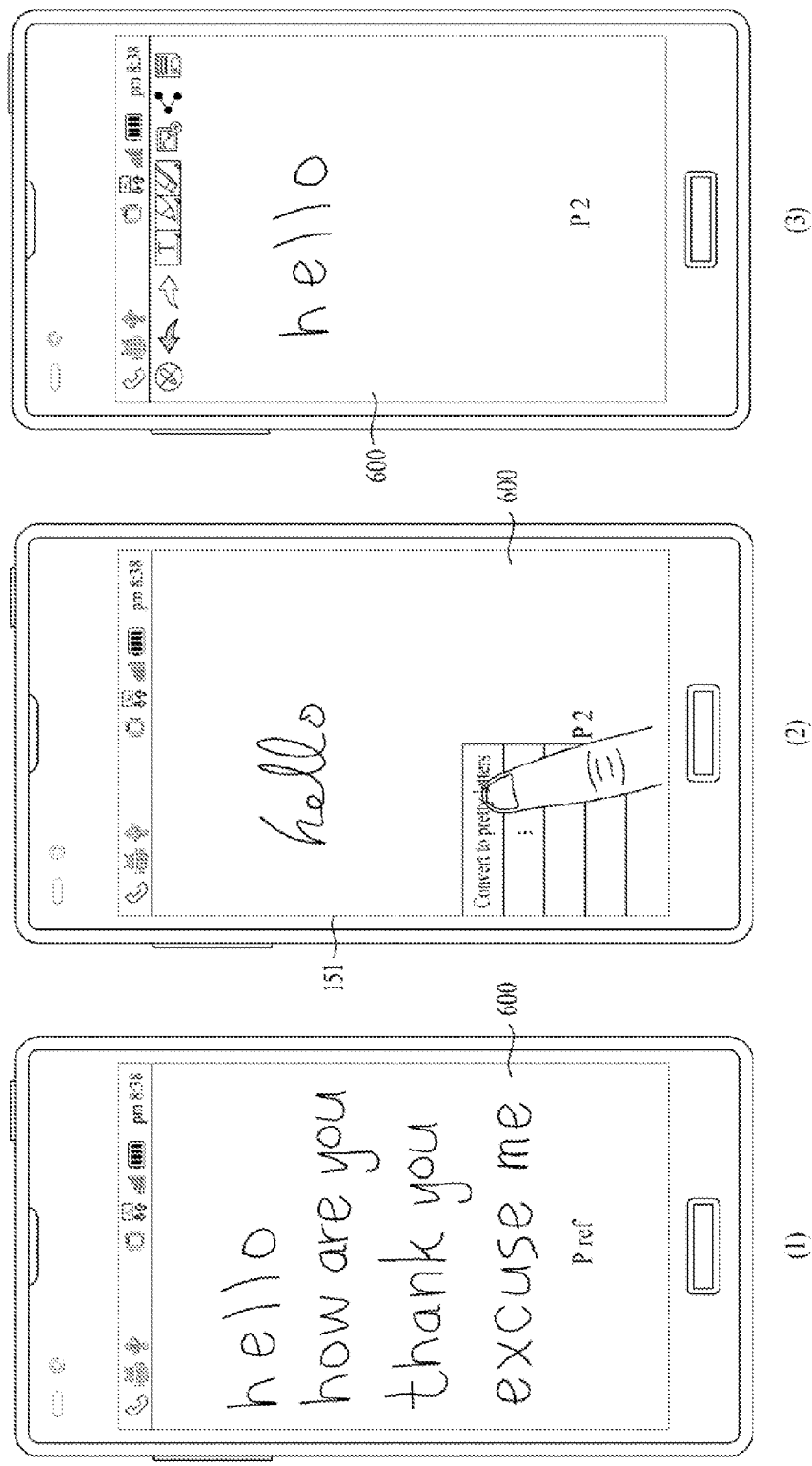
FIG. 12 and FIG. 13 are diagrams for various examples of a method of substituting some of handwritten characters saved as image(s) with different handwritten character(s) of the same contents according to another embodiment of the present invention.
Figure 13:
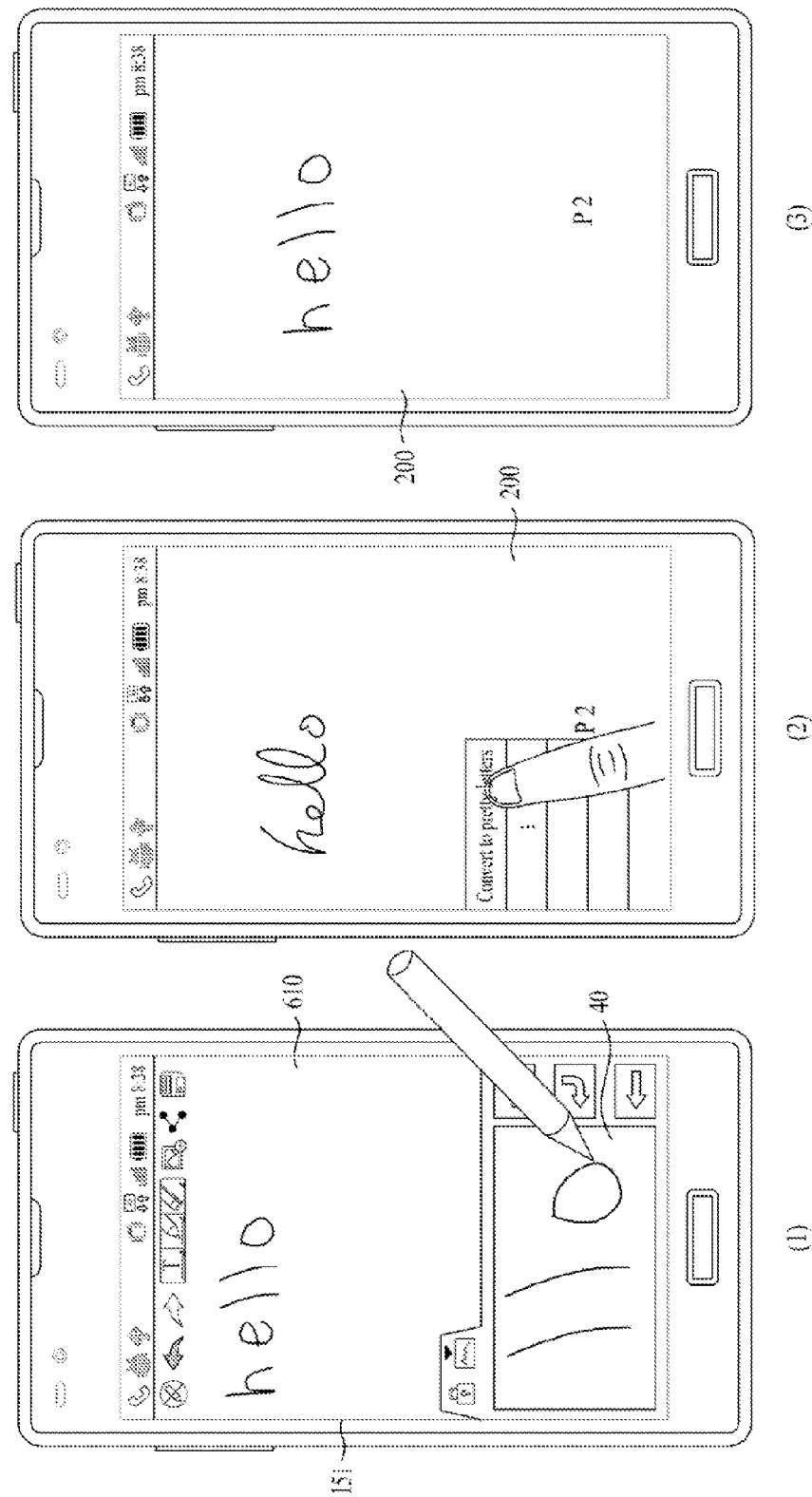

For another instance, referring to FIG. 12 and FIG. 13, first and second handwritten characters, each of which represents the same letter, may include different handwritten characters. In particular, each of the first handwritten character and the second handwritten character may have the same confirmed text. In this case, unlike the former instance, when the first handwritten character is substituted with the second handwritten character, a shape or style of a handwritten character is changed only without changing a handwriting inputted content.

In doing so, according to one embodiment, referring to FIG. 12, the second handwritten character may include a previously-saved handwritten character. For example, the second handwritten character may include a handwritten character contained in a preset specific page. Alternatively, the second handwritten character may include a handwritten character contained in a preset specific database. A detailed example of a case that the second handwritten character may be contained in the preset specific page is described as follows.

First of all, the specific page may play a role as a reference page and may be previously set by a user. A plurality of handwritten characters may be contained in the specific page and each of the handwritten characters may be saved as a separate image. And, a confirmed text corresponding to the handwritten character contained in the specific page may be saved in a manner of being linked to the corresponding handwritten character.

In particular, a reference page 600, as shown in FIG. 12 (1), may be configured. Referring to FIG. 12 (1), a plurality of handwritten characters may be inputted to the reference page 600. While the reference page 600 is saved in a mobile terminal, a previously saved page 200 shown in FIG. 12 (2) may be displayed. In doing so, in the previously saved page, 5 handwritten characters indicating 'h', 'e', 'l', 'l' and 'o' are contained as separate images, respectively, and a confirmed text linked to each of the handwritten characters may be saved in a text database D1 (cf. FIG. 6).

While the previously saved page 200 is displayed, a user command for substituting the handwritten character contained in the page 200 with a handwritten character of the same content contained in the reference page may be inputted. For instance, the user command may include an input for selecting a specific menu shown in FIG. 12 (2). If the user command is inputted, the controller may be able to extract a confirmed text corresponding to each of the handwritten characters contained in the previously saved page 200 from the text database D1. And, the controller may be able to extract a handwritten character image having the same confirmed text of the extracted confirmed text among the handwritten characters contained in the reference page 600.

If the handwritten character image of the same content is extracted from the reference page 600, the controller deletes a handwritten character image contained in the previously saved page 200 and may be then able to insert the handwritten character image of the reference page 600 into each position. As a result, referring to FIG. 12 (3), a shape of the handwritten character in the previously saved page 200 may be changed into the same shape of the handwritten character in the reference page 600.

According to another embodiment, referring to FIG. 13, a second handwritten character substituted with a first handwritten character may have the same confirmed text of the first handwritten character and may include a handwritten character inputted when a touchscreen operates in zoom mode for a handwritten character input.

In this case, the zoom mode for the handwritten character input corresponds to one of handwriting input modes. In the zoom mode for the handwritten character input, a handwritten character inputted to a zoom region by a user on a handwriting input is inputted to a mobile terminal by being reduced at a predetermined ratio. Using the zoom mode, even if a letter in large size is written by a user, a letter in small size is inputted. As a result, a handwritten character having relatively good readability may be inputted. A handwritten character inputted in the zoom mode may be saved as an individual image. And, this handwritten character may be inputted in a manner of being linked to a confirmed text matching the corresponding handwritten character.

In particular, a mobile terminal may operate in zoom mode shown in FIG. 13 (1). Referring to FIG. 13 (1), if a user inputs a handwritten character to a zoom region 40, the inputted handwritten character is added to a page by being reduced. While a page 610 containing the handwritten character inputted in the zoom mode is saved, referring to FIG. 13 (2), a previously saved page 200 may be displayed.

While the previously saved page 200 is displayed, a user command for substituting a handwritten character contained in the page 200 with a handwritten character of the same content contained in a reference page may be inputted. For instance, the user command may include an input for selecting a specific menu shown in FIG. 13 (2). If the user command is inputted, a controller may be able to extract a confirmed text corresponding to each handwritten character contained in the previously saved page 200 from a text database D1. And, the controller may be able to extract a handwritten character image having the same confirmed text of the extracted confirmed text from the page 610 containing the handwritten character inputted in the zoom mode.

Referring to FIG. 13 (3), if the controller extracts the handwritten character of the same content from the page 610 containing the handwritten character inputted in the zoom mode, the controller deletes a handwritten character image contained in the previously saved page 200 and may be then able to insert an image of the handwritten character inputted in the zoom ode into each position. As a result, a shape of the handwritten character in the previously saved page 200 may be changed into the same shape of the handwritten character inputted in the zoom mode.

Using the above-described embodiments, a user is able to change a specific handwritten character into a differently shaped handwritten character having the same content. Through this, in case that readability of a specific handwritten character is degraded, the specific handwritten character can be substituted with a handwritten character in a further organized shape.

In the following description, various embodiments related to a case that a handwritten character/text inputted to a mobile terminal is displayed by being converted to a text/handwritten character are explained with reference to FIGS. 14 to 16.

Figure 14:
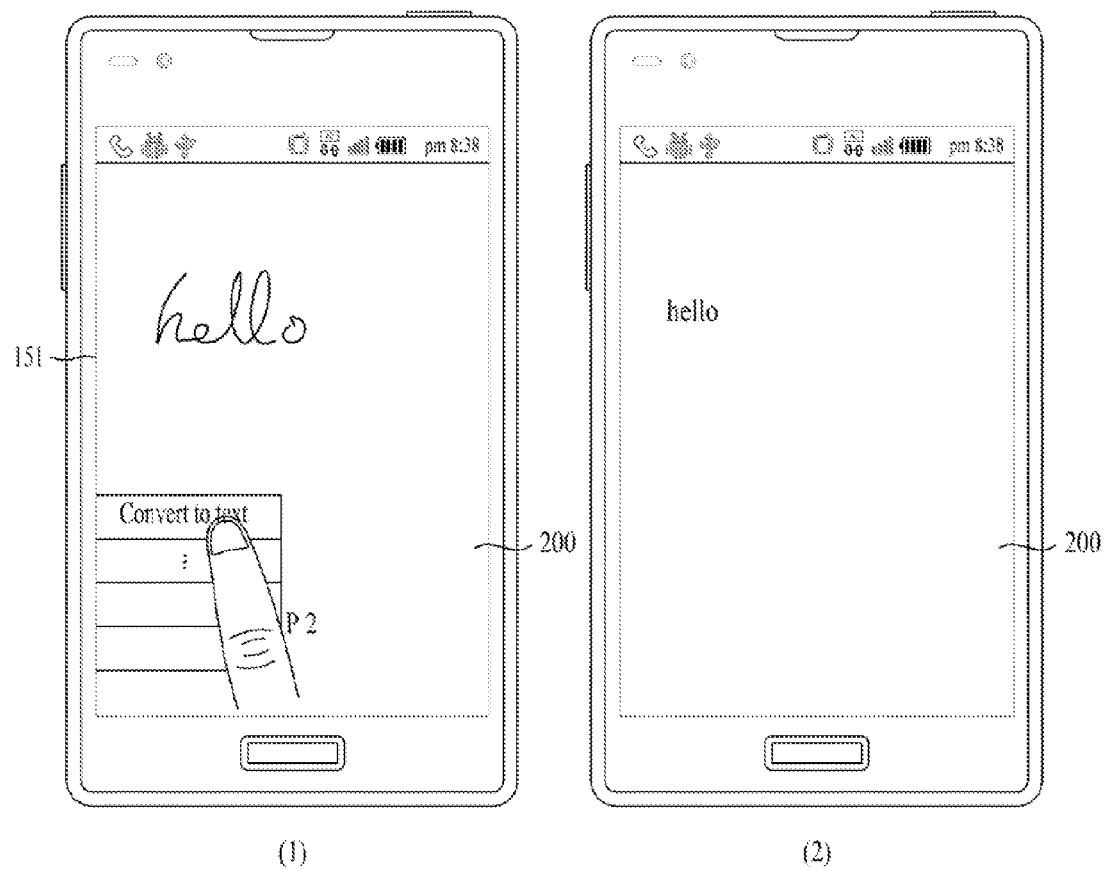
FIG. 14 is a diagram for one example of a method of converting handwritten characters saved as an image to a text according to another embodiment of the present invention.

FIG. 14 is a diagram for one example of a method of converting handwritten characters saved as an image to a text according to another embodiment of the present invention.

FIG. 14 shows one example of a case that a handwritten character saved as an image is displayed by being converted to a text.

According to the present embodiment, a controller may control a handwritten character saved as an image to be outputted by being converted to a confirmed text corresponding to each handwritten character. To this end, the controller extracts a confirmed text corresponding to each handwritten character from previously-saved confirmed texts and is then able to output the extracted confirmed text. The confirmed text may be displayed on the touchscreen instead of the corresponding handwritten character. Alternatively, when a previously-saved handwritten character is printed as a hard copy, the confirmed text may be printed into a confirmed text corresponding to a content inputted as a handwritten character.

For instance, referring to FIG. 14 (1), while a previously saved page 200 is displayed, a user command for converting a handwritten character contained in the page 200 to a text may be inputted. In this case, the user command may include a command for selecting a specific menu shown in FIG. 14 (1).

In response to the user command, the controller may be able to extract a confirmed text corresponding to the handwritten character in the previously saved page 200 from a text database D1. Subsequently, referring to FIG. 14 (2), the controller converts the handwritten character in the previously saved page 200 to a confirmed text and then displays the confirmed text.

Figure 15:
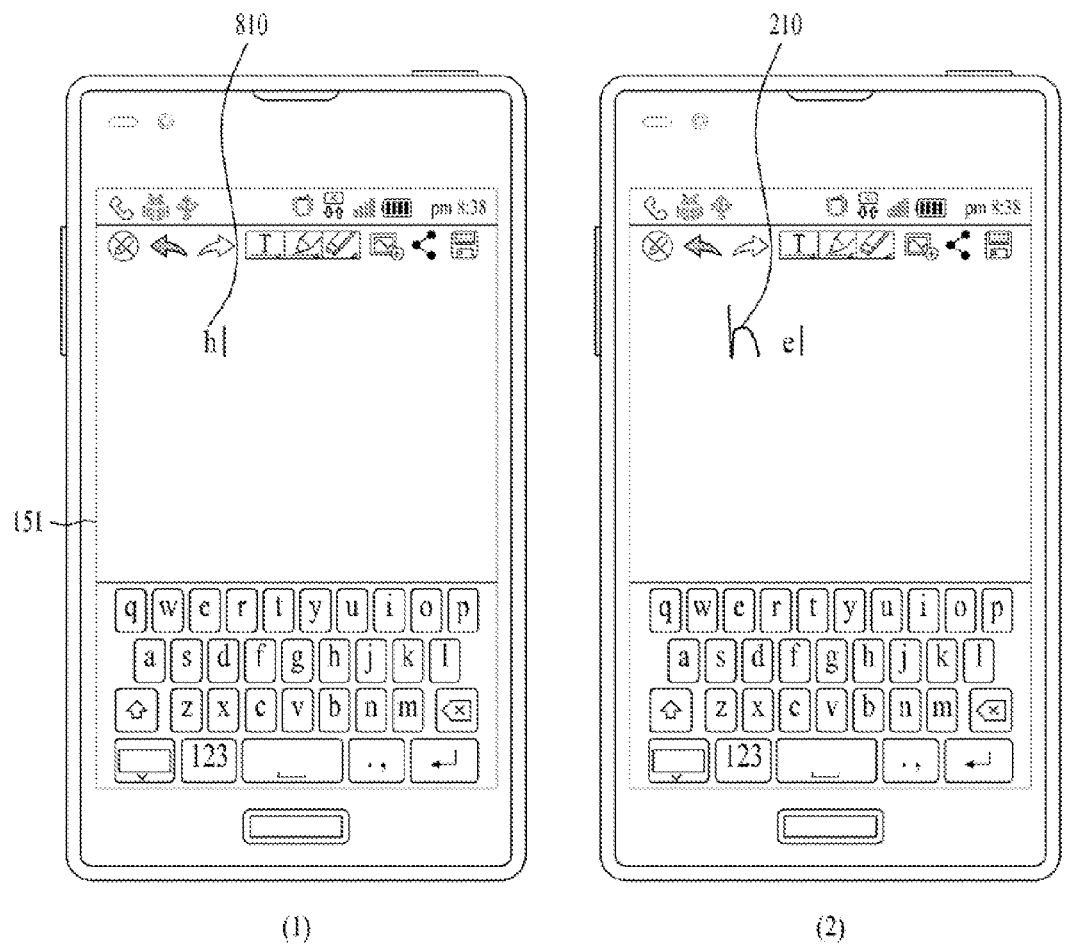
FIG. 15 is a diagram for one example of a method of converting a character inputted as a text to a previously saved handwritten character according to another embodiment of the present invention.
Figure 16:
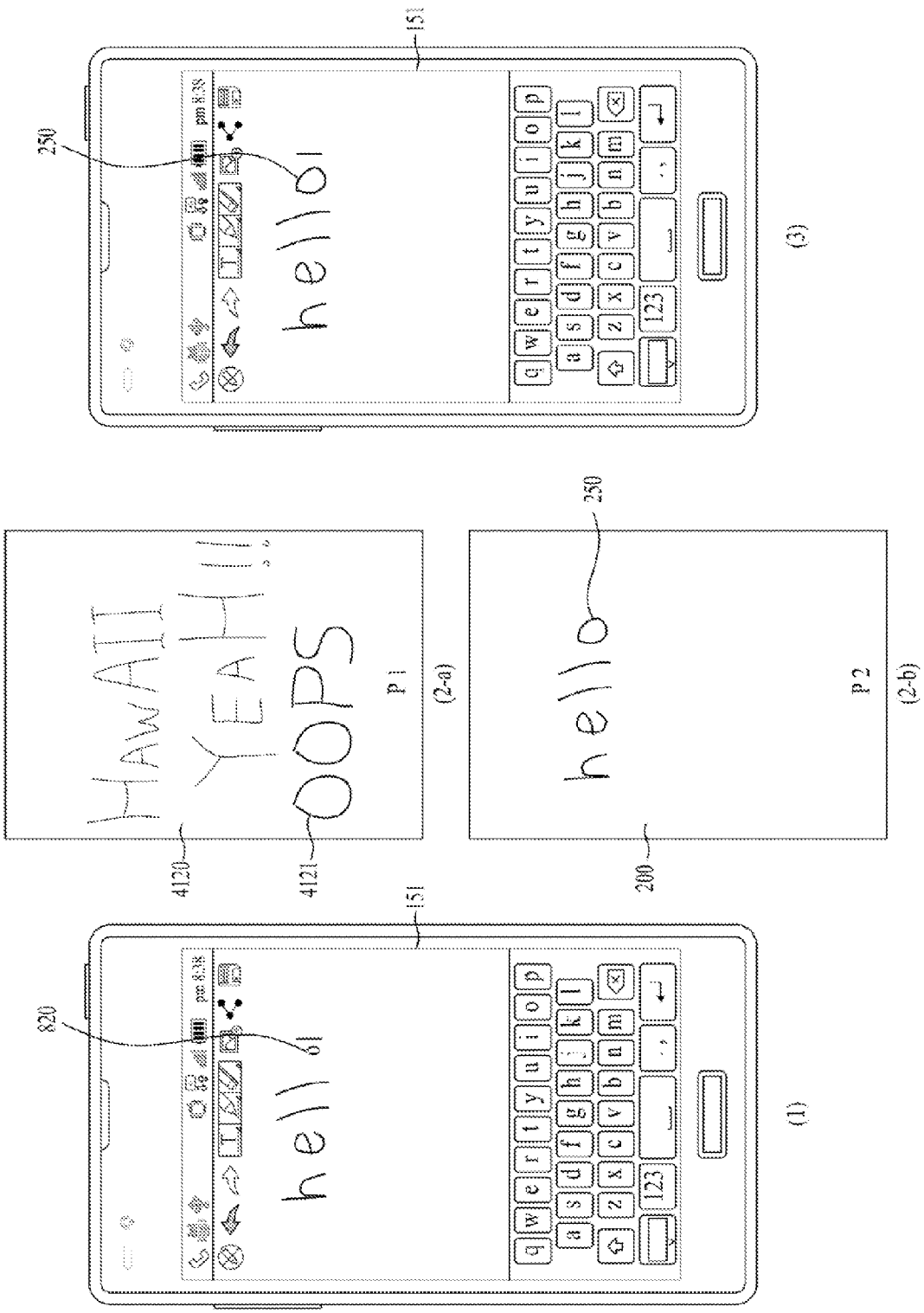
FIG. 16 is a diagram for one example of a method of converting the inputted character to a handwritten character selected from a plurality of handwritten characters saved for the text; and When handwritten characters are inputted.

On the contrary, various examples of converting a character inputted as a text to a handwritten character and then displaying the handwritten character are shown in FIG. 15 and FIG. 16.

FIG. 15 is a diagram for one example of a method of converting a character inputted as a text to a previously saved handwritten character according to another embodiment of the present invention.

Referring to FIG. 15, a controller may control a text inputted to a touchscreen to be displayed in a manner of being converted to a handwritten character having the inputted text as a confirmed text among handwritten characters saved as images. To this end, the controller searches previously-saved confirmed texts for a confirmed text matching the inputted text and may be then able to insert an image of a handwritten character corresponding to the found confirmed text instead of the inputted text. In this case, each of the handwritten characters may be saved as an individual image.

In particular, referring to FIG. 15 (1), a letter 'h' may be inputted as a text using a keyboard. If a controller detects that the text is inputted, the controller searches a text database D1 for a confirmed text matching the inputted text 810. If 'h' is found from confirmed texts, referring to FIG. 15 (2), the controller may be able to insert a handwritten character image 210 specified by the found text instead of the inputted text 810.

If a single text is inputted, FIG. 15 shows the example of converting the text to a corresponding handwritten character, by which the present embodiment may be non-limited. A controller converts a previously saved text to a corresponding handwritten character and may then display the corresponding handwritten character, by the process mentioned in the foregoing description. To this end, a user command for commanding the conversion may be inputted.

The controller may be able to change a plurality of texts in the same page to previously-saved handwritten characters of the same letters, respectively. In doing so, according to one embodiment, the controller may be able to convert each text to a handwritten character contained in the same page. In particular, in case that a plurality of handwritten characters of the same letter of a single text are saved, one of a plurality of the handwritten characters may be preferentially selected to replace the text. In this case, the preferentially selected handwritten character may be contained in the same page of a handwritten character to which a different text can be converted.

In particular, referring to FIG. 16 (1), a previously inputted text is displayed on a mobile terminal by being converted to a handwritten character. And, a letter 'o' may be newly inputted as a text. A controller searches a text database D1 for a confirmed text matching the inputted text 820.

In doing so, there may exist two confirmed texts, each of which matches the text 'o' 820. And, the handwritten characters specified by the two confirmed texts may include a handwritten character 4121 on a page shown in FIG. 16 (2-1) and a handwritten character 250 on a page 200 shown in FIG. **16 (2-*b*), respectively. In this case, the rest of the texts except the text 'o' in FIG. 16 (1) are converted to the handwritten characters on the page 200 shown in FIG. 16 (2-*b*). Hence, referring to FIG. 16 (3), the controller preferentially selects the text 250 from the two handwritten characters and may be then able to insert the selected text instead of the text 'o' 820**.

According to the present embodiment, if a plurality of texts in a same page are converted to handwritten characters saved in the same page, shapes of the converted handwritten characters may be maintained relatively similar to each other. This is because handwritten characters inputted onto the same page may be inputted by one person in the same state highly possibly.

In the following description, when a handwritten character is inputted, an embodiment related to a case of providing a result from translating a letter inputted by the handwriting into a letter in different language by real time is explained with reference to FIG. 17.

According to the present embodiment, as a handwritten character is inputted, a controller searches for a confirmed text of the handwritten character in previously-designated different language and may control a result of the search to be displayed by real time.

When a handwritten character is inputted, a controller may be able to translate the confirmed text of the handwritten character in a preset language using a previously saved dictionary or web. For instance, if Korean is inputted by handwriting, the controller may be able to search the meaning of the inputted Korean in English using a dictionary or web. A dictionary may be previously saved in a mobile terminal. And, the dictionary may be updatable. Alternatively, the controller activates a web browser and may be then able to search for the confirmed text.

Prior to an operation of the present embodiment, a real-time translate mode may be entered to enable a controller to translate a handwriting inputted character by real time. The entry into the real-time translate mode may be performed by one of an activation of an application, a selection of a specific menu, a selection of a specific soft key and the like. Once the real-time slate mode is entered, a user may be then able to perform a handwriting input. In doing so, the controller may be able to provide the user with a result from searching a corresponding confirmed text in a preset language no matter what the handwriting inputted character is.

Figure 17:
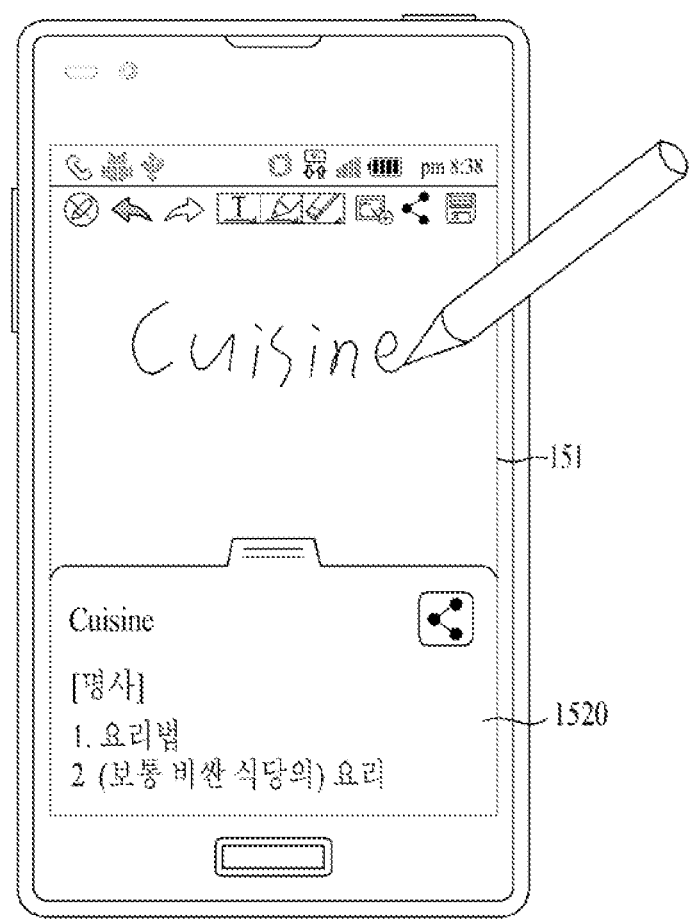
FIG. 17 is a diagram for one example of a method of providing a translated content resulting from a content of the inputted handwritten characters by real time according to a further embodiment of the present invention.

For instance, referring to FIG. 17, a plurality of handwritten characters indicating 'cuisine' may be inputted to a touchscreen in real-time translate mode. As each handwritten character is inputted, the controller may be able to determine a confirmed text corresponding to the inputted handwritten character. Once the confirmed text is determined, the controller directly searches a combination of the determined confirmed texts in preset language using a dictionary or web. In the drawing, the controller is set to translate an English handwritten word into Korean.

Referring to FIG. 17, the controller finds 'cuisine' in Korean and then displays a corresponding search result 1520 by real time. In the present drawing, a single word is inputted by handwriting. Alternatively, if a whole sentence is inputted by handwriting, it may be able to search a combination of confirmed texts for the handwritten characters constructing the sentence. In this case, a real-time translation of the sentence may be provided.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen;
a memory; and
a controller configured to:
cause the memory to store a handwritten character received via the touchscreen as an image, the image tagged to a confirmed text character;
search in a text database for a page of a file including the stored image that matches a search term received via the touchscreen as a handwritten character, wherein the searched page has at least two handwritten characters including the matched stored handwritten character; and
cause the touchscreen to display the searched page, sizes of the at least two handwritten characters included in the displayed searched page having been adjusted to a same preset size.

2. The mobile terminal of claim 1, wherein the controller is further configured to:
recognize the handwritten character in real-time;
cause the touchscreen to display one or more candidate text characters that correspond to the recognized handwritten character;
cause the memory to store one of the one or more candidate text characters as the confirmed text character; and
link the confirmed text character to the handwritten character.

3. The mobile terminal of claim 2, wherein the one or more candidate text characters differ from each other.

4. The mobile terminal of claim 2, wherein the controller is further configured to cause the memory to store a primary candidate text character having a highest similarity to the handwritten character among the one or more candidate text characters as the confirmed text character when none of the one or more candidate text characters is selected by a user.

5. The mobile terminal of claim 4, wherein the controller is further configured to cause the memory to store the primary candidate text character in response to input of another handwritten character when none of the one or more candidate text characters is selected.

6. The mobile terminal of claim 2, wherein the controller is further configured to:
cause the memory to store mapping information that links the tagged confirmed text character to the stored handwritten character, the mapping information including at least information related to a location of the handwritten character in a stored page, information related to a location of the stored page in a content file, or a user identification (ID).

7. The mobile terminal of claim 2, wherein the controller is further configured to:
search stored confirmed text characters that are linked to handwritten characters in order to find a confirmed text character that corresponds to the search term that is handwritten in a first region of the touchscreen; and
cause the touchscreen to display an image comprising a handwritten character that corresponds to the confirmed text character found by the searching.

8. The mobile terminal of claim 2, wherein the controller is further configured to:
search stored confirmed text characters that are linked to handwritten characters in order to find a confirmed text character that corresponds to the search term that is typed as text; and
cause the touchscreen to display an image comprising a handwritten character corresponding to the confirmed text character found by the searching.

9. The mobile terminal of claim 8, wherein the controller is further configured to:
cause the touchscreen to display the handwritten characters in a page such that a size of each of the handwritten characters is normalized according to the preset size when the touchscreen displays a page containing the handwritten character corresponding to the confirmed text character found by the searching.

10. The mobile terminal of claim 2, wherein the controller is further configured to:
replace the handwritten character with an alternative handwritten character in response to a user command.

11. The mobile terminal of claim 10, wherein:
the handwritten character corresponds to a same confirmed text character as the search term that is handwritten in a first region of the touchscreen; and
the alternative handwritten character is a substitute term that is handwritten in a second region of the touchscreen.

12. The mobile terminal of claim 10, wherein:
the handwritten character and the alternative handwritten character correspond to a same confirmed text character; and
the alternative handwritten character is a stored handwritten character.

13. The mobile terminal of claim 10, wherein:
the handwritten character and the alternative handwritten character correspond to a same confirmed text character; and
the alternative handwritten character is a character that is handwritten on the touchscreen when the touchscreen is in a zoom mode.

14. The mobile terminal of claim 2, wherein the controller is further configured to:
- convert the handwritten character to the confirmed text character; and
- output the confirmed text character as text.

15. The mobile terminal of claim 2, wherein the controller is further configured to:
- convert text that is input on the touchscreen to a handwritten character that corresponds to a same confirmed text character as the text that was input; and
- cause the touchscreen to display the text that was input as the handwritten character that corresponds to the same confirmed text character.

16. The mobile terminal of claim 2, wherein the controller is further configured to:
- translate the confirmed text character to a preset language; and
- cause the touchscreen to display the translated confirmed text character in real-time.

17. A method of controlling a mobile terminal, the method comprising:
- storing, in a memory, a handwritten character received via a touchscreen as an image, the image tagged to a confirmed text character;
- receiving an input of a search term via the touchscreen as a handwritten character;
- searching in a text database for a page of a file including the stored image that matches the search term, wherein the searched page has at least two handwritten characters including the matched stored handwritten character; and
- displaying the searched page, sizes of the at least two handwritten characters included in the displayed searched page having been adjusted to a same preset size.

18. The method of claim 17, further comprising:
- recognizing the received handwritten character in real-time;
- displaying one or more candidate text characters corresponding to the handwritten character;
- storing one of the one or more candidate text characters as the confirmed text character; and
- linking the confirmed text character to the handwritten character.

19. The method of claim 18, further comprising:
- substituting the handwritten character with an alternative handwritten character in response to a user command.

20. A non-transitory computer-readable recording medium comprising:
- first, second, and third commands that are recorded in the recording medium, wherein:
- the first command is configured to cause a memory to store a handwritten character received via a touchscreen as an image, the image tagged to a confirmed text character;
- the second command is configured to cause a controller to search in a text database for a page of a file including the stored image that matches a search term received via the touchscreen as a handwritten character, wherein the searched page has at least two handwritten characters including the matched stored handwritten character; and
- the third command is configured to cause the controller to cause displaying of the searched page such that sizes of the at least two handwritten characters included in the displayed searched page is adjusted to a same preset size.

* * * * *